March 10, 1970 W. E. DURNAN ET AL 3,499,506
LUBRICANT DISTRIBUTING SYSTEM AND ACCUMULATOR USED THEREIN
Filed Oct. 10, 1967 5 Sheets-Sheet 1

INVENTOR.
WILLIAM E. DURNAN
PAUL H. REEVE
BY
OSTROLENK, FABER, GERB & SOFFEN
ATTORNEYS

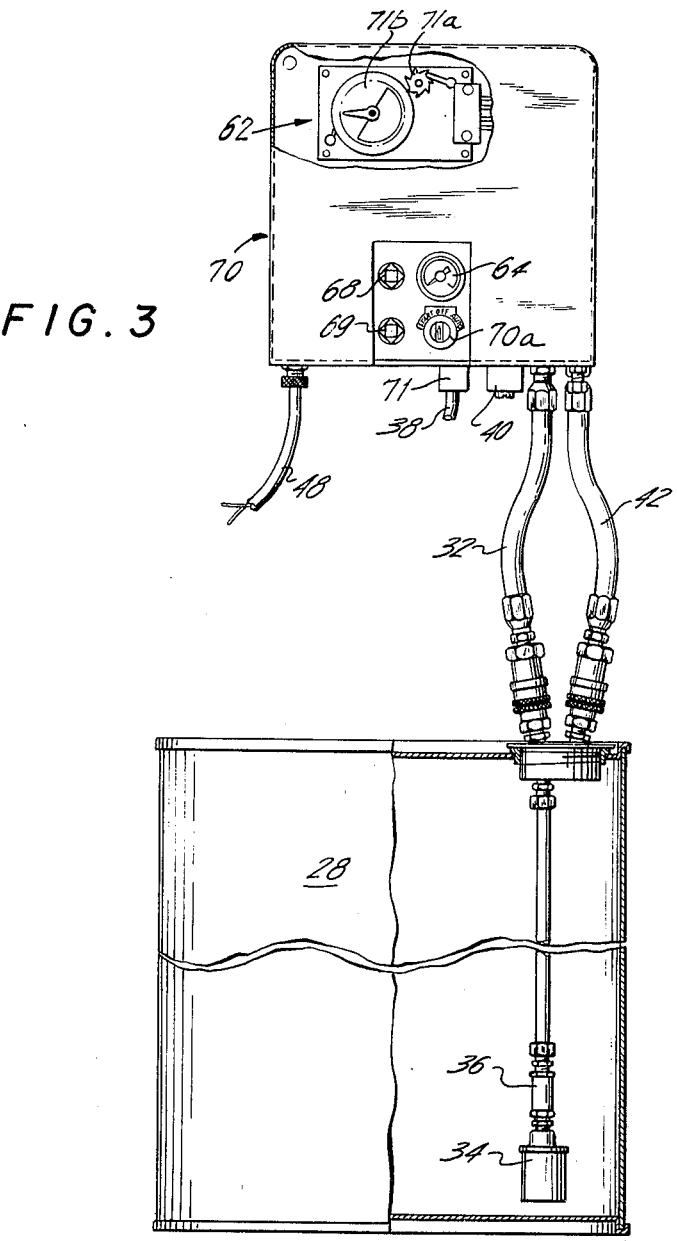

March 10, 1970 W. E. DURNAN ET AL 3,499,506
LUBRICANT DISTRIBUTING SYSTEM AND ACCUMULATOR USED THEREIN
Filed Oct. 10, 1967 5 Sheets-Sheet 3
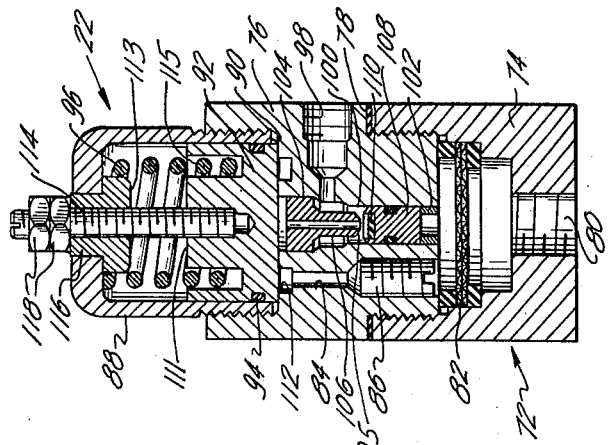
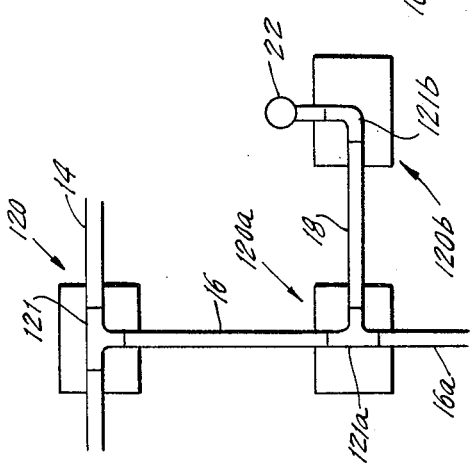
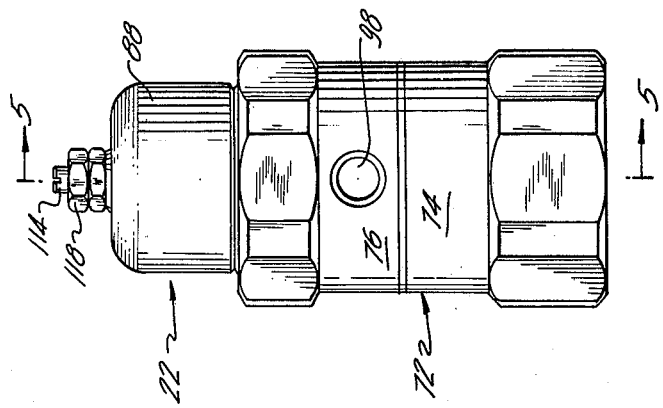
INVENTOR.
WILLIAM E. DURNAN
PAUL H. REEVE
BY
OSTROLENK, FABER, GERB & SOFFEN
ATTORNEYS

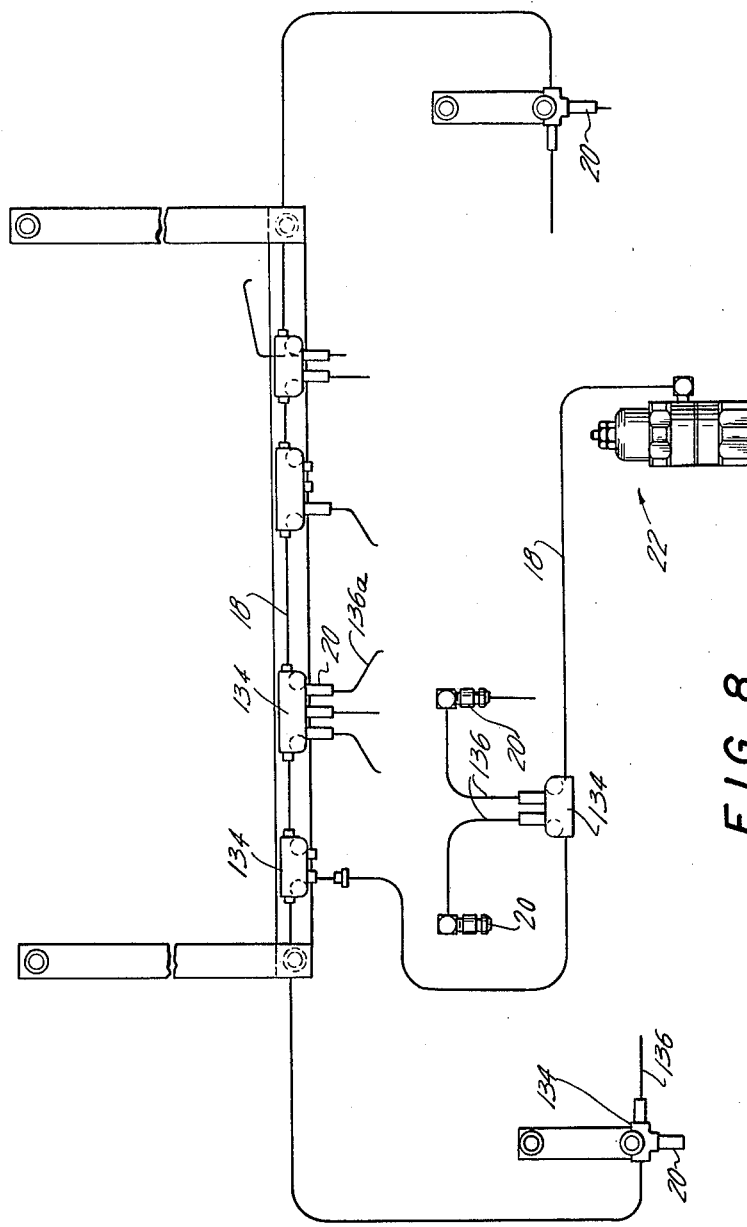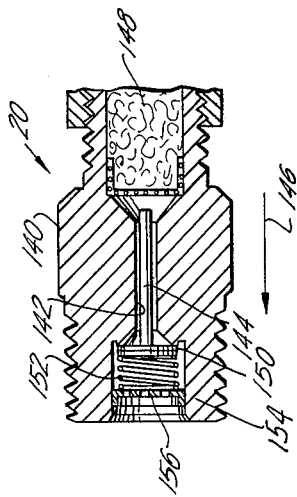
FIG. 8
FIG. 9
INVENTOR.
WILLIAM E. DURNAN
PAUL H. REEVE
BY
OSTROLENK, FABER, GERB & SOFFEN
ATTORNEYS

United States Patent Office 3,499,506
Patented Mar. 10, 1970

3,499,506
LUBRICANT DISTRIBUTING SYSTEM AND ACCUMULATOR USED THEREIN
William E. Durnan, Ridgewood, and Paul H. Reeve, River Vale, N.J., assignors to Auto Research Corp., Boonton, N.J., a corporation of Delaware
Filed Oct. 10, 1967, Ser. No. 674,201
Int. Cl. E16n 7/14; G01f 11/06; E03b 7/07
U.S. Cl. 184—7                           12 Claims

ABSTRACT OF THE DISCLOSURE

A system for distributing lubricant to a large number of machines, the system having a main distribution line into which lubricant is pumped from a reservoir for a period of time; a plurality of branch distribution lines connected in parallel with each other and communicating with the main distribution line to receive lubricant therefrom, and a plurality of machine lubricating lines connected with each branch distribution line; the machine lubricating lines at each branch distribution line being in parallel; each machine lubricating line carrying a plurality of meter units through which the lubricant is apportioned to predetermined parts of a machine; and an accumulator communicating with each machine lubricating line upstream of the plurality of meter units; each accumulator having a valve arrangement so that during operation of the pump, lubricant is accumulated in every accumulator, and upon termination of pump operation, lubricant is delivered from the several accumulator means through the several machine lubricating lines and the meter units carried thereby to the machines; and a plurality of junctions between distribution lines.

---

The present invention relates to a lubricant distributing system for lubricating bearings and points on a plurality of machines and to a lubricant accumulator used in connection therewith.

A factory, mill or plant has a large number of individual machines, each of which has a plurality of bearings or points that must each receive lubrication periodically. In order to distribute lubricant to such a large number of points on a large number of machines, it is conventional to provide relatively complex systems which include, for example, a separate pump for each machine. All of the pumps must be individually operated whenever lubricant is to be delivered. Thus, the operator of each machine has as a part of his duties the responsibility to periodically actuate the pump of the lubricating system of his machine to supply lubricant to the machine. The present invention overcomes the requirement that separately operable lubricant pumps be provided for lubricating each machine.

An alternative manner of lubricating bearings or points known in the prior art is to provide a central pump which is connected by means of lubricant distribution lines to a lubricant apportioning element positioned at each bearing or point to be lubricated. Each element apportions the lubricant properly by being formed to restrict the flow of lubricant through itself to a particular volume per unit time. The entire system must be at a sufficient pressure to force lubricant through each apportioning element at the element's rate of flow capacity for the entire time lubricant is being pumped. Thus, the system pressure must be sufficiently high to insure that the pressure drop in the system due to the discharge of lubricant through the apportioning elements nearest the pump is not sufficient to decrease the required flow of lubricants through the apportioning elements furthest from the pump. Operating a system at such a high pressure requires a larger pump, thicker walled conduits for containing lubricant under pressure and, therefore, requires a generally less compact system than operating a system where the pressure may be maintained at a lower level.

It is a primary object of the present invention to provide a lubricant distributing system which is simpler and less expensive than conventional systems of the above types.

A further object of the present invention is to provide a lubricant distributing system which is automatically operable at predetermined times to distribute lubricant to a plurality of bearings and points on a plurality of machines.

It is another object of the present invention to eliminate the necessity for individual lubricating operations for each machine.

It is a further object of the present invention to provide a system for delivering lubricant from a single reservoir to a plurality of points and bearings on a plurality of machines.

It is another object of the present invention to provide a compact lubricating system wherein the system pressure may be maintained at a low level.

It is a further object of the invention to provide for use in a lubricant distributing system of the above type an accumulator for receiving lubricant for a given machine from a central pump and for delivering the lubricant to the machine.

It is another object of the present invention to provide a lubricant distributing system which need not be fully shut down when any one part requires maintenance.

It is still another object of the present invention to provide a novel junction between lubricant distribution lines which readily permits removal and replacement of a particular line, which junction is adaptable for use in all systems of conduits.

In accordance with the invention, the lubricant distributing system includes a single lubricant reservoir and a pump means communicating therewith for pumping lubricant therefrom. A main distribution line communicates with the pump means to receive lubricant under pressure therefrom, and a plurality of branch distribution lines communicate with the main distribution line to receive lubricant from the latter. A plurality of machine lubricating lines, each for delivering lubricant to a particular machine communicate with each branch distribution line. A plurality of meter units are carried by each machine lubricating line for metering or apportioning the flow of lubricant therefrom to predetermined points and bearings of a given machine.

An accumulator means communicates with each machine lubricating line upstream of the metering units for receiving lubricant under pressure during operation of the pump means and for delivering the lubricant along the machine lubricating line to the several meter units thereof when the pump means stops operating. While the present invention is illustrated with one accumulator means per machine, within the contemplation of the invention, some machines make use of more than one accumulator and some accumulators may service more than one machine. The accumulator means of the invention has a body formed with an inlet, and an outlet through which lubricant discharges from the accumulator. The body has a cylinder containing a first piston. A spring means acts on the first piston to displace it in a direction which discharges lubricant from the cylinder.

A valve means is interposed between the inlet and the cylinder for providing for flow of lubricant under pressure through the inlet into the cylinder, thereby displacing the first piston in opposition to the spring means. This valve means operates in one direction and when, as described below, the above noted spring means displaces the piston to discharge lubricant from the cylinder, the valve means prevents lubricant from returning to the inlet and the lubricant passes through the outlet.

A bore in the body communicates with the cylinder, the accumulator outlet and the inlet. A tubular member in the bore blocks the same and has one open end directed toward and communicating with the cylinder and an opposed open end directed toward the outlet. A second piston is slidable in the bore between the tubular member and the cylinder, the second piston is displaced in the bore to close the opposed open end of the tubular member which is directed toward the inlet, so that flow of lubricant through the outlet is prevented while lubricant flows into the accumulator.

When the pump stops operating and pressure at the inlet drops, the pressure of the lubricant in the cylinder of the accumulator displaces the second piston away from the tubular member to open the end of the latter which is directed toward the outlet, and lubricant flows through the outlet as the spring means displaces the first piston in a direction which discharges lubricant. The previously described one-way valve means plays its critical role at this time by preventing lubricant from escaping back to the inlet, whereby all lubricant beneath the first piston passes through the outlet.

The benefits of the lubricating system of the present invention arise from the use of the above described accumulator means, or of any accumulator means which performs the same function. A central pump fills each of the plurality of accumulator means in the entire system. The central pump may be a low pressure pump and the system may be at low pressure. There is an extended period of time available to fill all of the accumulator means, namely the period of time between each required discharge of lubricant, which may be a matter of hours, for example, making the slowness with which the accumulator means fill insignificant. The pressure drop over the system is unimportant since there is a substantial period of time to fill all of the accumulator means.

The accumulator means near the pump may become filled before the pressure in the system is sufficient in the vicinity of the accumulator means away from the pump to cause the latter to be filled. However, it is insignificant that the accumulator means may fill in sequence rather than simultaneously, since the various accumulator means store the correct amount of lubricant for their particular machines. Sequential filling will increase the time for filling all accumulator means. But, there is a substantial period between each required discharge of lubricant, providing adequate time to fill all accumulator means.

The accumulator means permit the use of a smaller pump which builds up a smaller system pressure than would be otherwise required. The pump may also pump a small volume of lubricant per unit time since the rate the accumulator means must be filled need only be sufficient so that all accumulator means have been filled before a charge of lubricant must be delivered to the various bearings and points. A small pump reduces the pressure drop over the entire system, reduces the thickness of the walls of the lubricant carrying conduits and the pressure safety factor and protective equipment that must be built into the conduits and their containers, and makes the entire lubricating system more compact.

Since one lubricating system may be used for an entire factory or plant, or for a large part thereof, the lubricant distributing lines carrying lubricant from the central pump and distributing same have to extend across a substantial part of the factory or plant. To avoid the obvious problems of having lubricant carrying lines stretch across the floor, and to avoid the unsightly appearance of and the greater length lines required for lubricant lines extending along the exterior of walls or ceilings, the lubricant distributing lines may be buried beneath the floor of the plant or factory. It is to be understood that this is suggested only as one manner of placing the distribution lines. If the distribution lines are placed beneath the floor, they must be joined at junctions, and it is contemplated that junction boxes will be placed in the floor, the boxes having a removable cover permitting access to the junctions between the various conduits.

The junctions have a novel feature which permits removal of a defective line, conduit or pipe without requiring that it be sawed or otherwise cut before being removed. A junction element for joining conduits is adapted to be secured to the end of each line. However, if it is desired to remove or replace a particular line, the junction element can be loosened so that the line may be slipped axially with respect to or out of the junction element; or the junction element may be slipped off the line. If a particular line being replaced is positioned away from the edges of the floor, in order to slide either the particular line or the junction element to which it is attached, it may be necessary to move a series of lines and junction elements in order to permit the particular line or junction element to be moved. This series of lines or junction elements would be those affected by movement of any one of the junction elements or lines to be moved.

The foregoing objects and general description will be better understood with reference to the following description when it is read in conjunction with the accompanying drawings in which:

FIGURE 1 schematically represents a typical layout of a lubricant distributing system of the invention;

FIGURE 3 is a partly sectional fragmentary and schematic elevation showing how the single lubricant reservoir of the invention is connected into the system;

FIGURE 4 is an elevation of an accumulator of the invention;

FIGURE 5 is a longitudinal sectional elevation of the accumulator of FIGURE 4, taken along line 5—5 of FIGURE 4 in the direction of the arrows;

Figure 6:
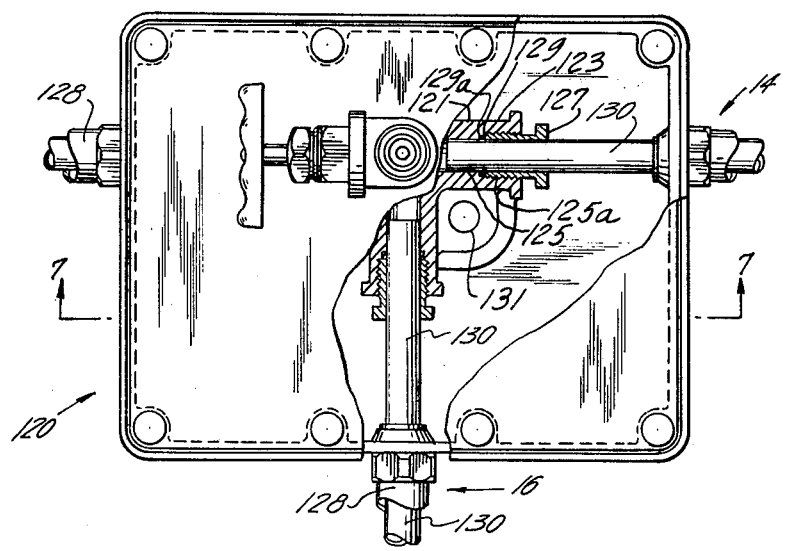
FIGURE 6 is a partially sectioned top plan view of a typical junction box installation of the system of the invention, FIGURE 6 further illustrating the construction of the main and branch distribution lines.
Figure 7:
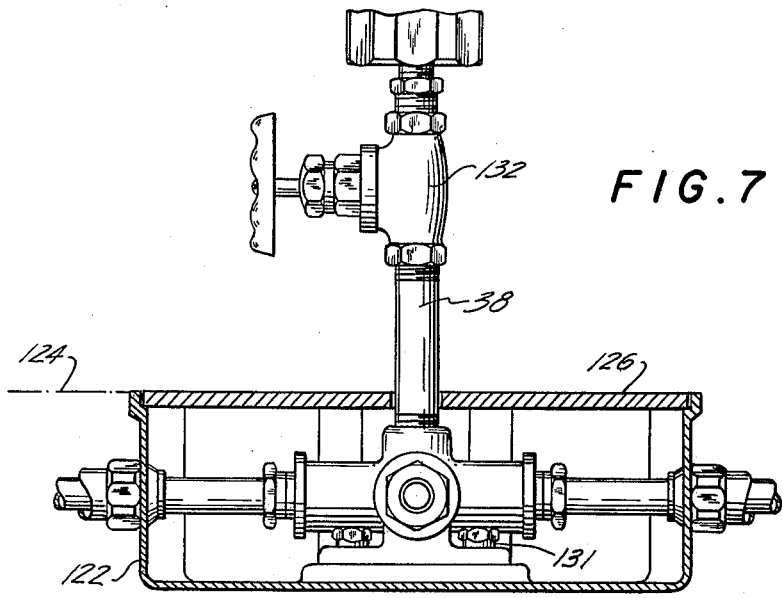

FIGURE 6A schematically illustrates a novel junction box arrangement which may be used in conjunction with the system of the invention;

FIGURE 7 is a transverse sectional elevation of the structure of FIGURE 6 along the line and in the direction 7—7;

FIGURE 8 is a schematic representation of a typical machine lubricating line; and FIGURE 9 is a longitudinal sectional elevation of a meter unit.

Figure 1:
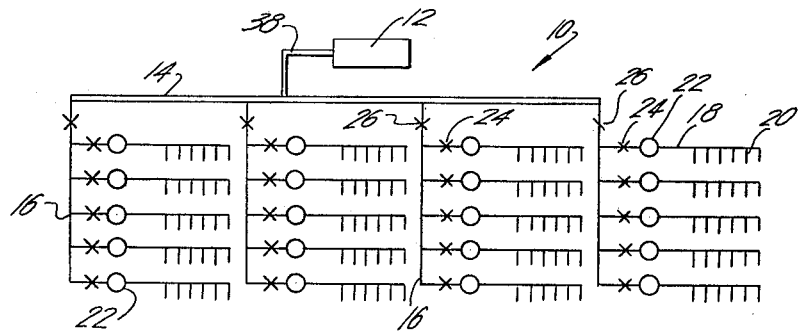

Referring to FIGURE 1, the lubricant distribution system 10 illustrated therein includes a central pumping station 12 from which lubricant, in the form of oil, for example, is pumped from a single reservoir to a main distribution line 14. A plurality of branch distribution lines 16 are connected in parallel with each other to the main distribution line 14, and each branch distribution line 16 has a plurality of machine lubricating lines 18 communicating therewith and connected in parallel to each other. The several machine lubricating lines 18 are located at the several machines which are to be lubricated. Each lubricating line 18 carries a plurality of meter units 20 which apportion the lubricant in their respective line 18 to the particular bearings or points to be lubricated. Typical meter units are shown in U.S. Patent No. 2,992,659, issued on July 18, 1961 to Thomas R. Thomas, entitled "High Restriction Metering Unit" and assigned to the assignee hereof, and in copending application Ser. No. 624,976 (AJ–81), filed Mar. 20, 1967 in the name of Thomas R. Thomas entitled "Lubrication" and assigned to the assignee hereof.

An accumulator means 22, described in greater detail below, communicates with each machine lubricating line 18 upstream of the several meter units 20 carried thereby.

Each machine lubricating line 18 is provided upstream of the accumulator means 22 with a shut-off valve 24; and each branch distribution line 16 has upstream of the several machine lubricating lines 18 connected thereto a shut-off valve 26. While the shut-off valves 24 and 26 are not essential, they are of considerable advantage to the system. If an accumulator 22 or a meter unit 20 malfunctions for any reason, it is possible to close an individual shut-off valve 24 so that the system can continue to operate while repairs or being made. If a branch distribution line 16 should become crimped or develop a leak, by closing the valve 26 on the faulty branch distribution line, the line can be repaired while the remainder of the system continues to operate.

With this system the lubricant which is pumped from the central pumping station 12 fills all of the accumulators 22 before flowing out of the latter to the several meter units 20. When the pump stops operating, the several accumulators 22 respond automatically to the drop in pressure in the distribution lines 14 and 16 to deliver the lubricant to the several meter units 20 which apportion the lubricant to the several parts of the machines that require lubrication. The central pumping station 12 is located so that the main distribution line 14 is as short as possible.

Figure 2:
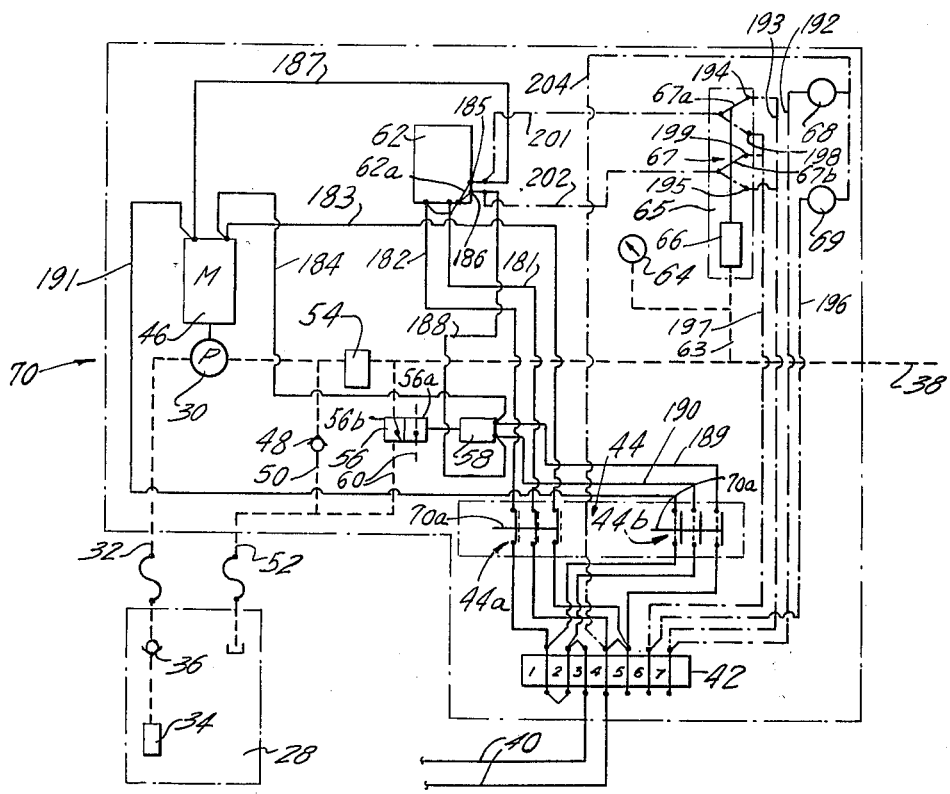
FIGURE 2 is a schematic representation of the hydraulic flow and the electrical controls at the central pumping station of the distributing system of the invention.

Referring to FIGURE 2, lubricant carrying conduits are represented by dashed lines, electric current carrying lines and electric switch elements are represented by solid lines, and alternative electric current carrying lines and alternative positions for movement of electric switch elements are indicated in dash-dot lines. At the lower left corner of FIGURE 2, there is schematically represented a single lubricant reservoir 28 which may take the form, for example, of a 55 gallon drum. The lubricant in the reservoir 28 is pumped out of the latter by a pump means 30 which communicates through a suction line 32 with the interior of the reservoir 28. A suction filter 34 is situated within the reservoir 28 near the bottom thereof and at the inlet end of the suction line 32. Line 32 is also provided with a one-way or non-return valve 36. The pump delivers the lubricant under pressure to the line 38 which communicates with the main distribution line 14.

A constant-pressure pressure release valve 48 is positioned on first lubricant return line 50 which is connected to main lubricant return line 52. Valve 48 is normally closed so that lubricant pumped by pump 30 passes through filter 54 instead of returning through return line 50 to reservoir 28. When the system pressure exceeds a predetermined value, e.g., a predetermined safety factor for the system, valve 48 opens and pressure in the system is relieved through valve 48 and return lines 50, 52.

A solenoid operated valve 56 operated by solenoid switch 58, in a manner to be described, is connected in a second lubricant return line 60, which is, in turn, connected with main return line 52. When the solenoid switch 58 has operated, the valve 56 is in the position illustrated in box 56a, wherein the line 60 is open. The lubricant being pumped passes freely through the conduit offering least resistance, namely branch conduit 60, to return line 52 and back to reservoir 28. When switch 58 has not operated, valve 56 is in the position a box 56b and line 60 is closed.

Electrical supply lines 40 are connected to terminal board 42. Switch 44 having sides 44a and 44b is connected with terminal board 42. When side 44a of switch 44 is moved so that the contacts therein are closed, a circuit is completed to timer 62 through leads 181, 182. As will be further described, the timer provides sequential operation of the system. The lead 183 is directly connected to motor 46 and through lead 184 to solenoid switch 58.

The system is now ready for automatic operation to fill all of the accumulator means 22. In normal operation, whenever pumps 30 is operating, valve 56 must be closed, as shown in box 56b so that lubricant flows in the system; and whenever pump 30 is off, valve 56 must be open, as shown in box 56a, so that pressure in the system can be relieved and backflow of lubricant from the discharging accumulator means 22 which occurs for reasons described below, will be able to return to the reservoir 28.

The timer 62 has a switch arm 62a movable between terminals 185 and 186. When the timer moves the switch arm 62a to terminal 185, a circuit to motor 46 is completed through lead 187. No circuit is completed to solenoid switch 58. Therefore, the valve 56 is in the position shown in box 56b and lubricant return line 60 is closed. Therefore, lubricant is pumped into the system. When the timer 62 moves its switch arm 62a into engagement with terminal 186, the circuit to motor 46 is broken and a circuit through lead 188 to solenoid switch 58 is completed. The solenoid switch 58 operates to open valve 56, thereby to open return line 60. This enables the system pressure to be relieved.

When the pump is started after a new reservoir 28 is substituted for the old one, there will be air in the suction line 32 between filter 34 and one-way valve 36, which air must be expelled from the system before lubricant can be pumped through the distribution lines to the accumulator means. Switch portion 44b is closed. Both terminals of solenoid switch 58 are supplied with power through leads 189, 190 and both terminals of motor 46 are connected with the power supply through leads 184 and 191. Thus, the motor 46 operates and the solenoid switch 58 holds valve 56 in its open position shown in box 56a. The initial operation of the pump sends lubricant already in line 32 around through lines 60, 52 back to reservoir 28 and also pumps the air in suction line 32 out through the return lines 60, 52.

When the entire system is to be turned off, both of switch portions 44a and 44b are opened.

Line 38 has a branch line 63 communicating therewith which leads to a pressure indicating meter 64 and a pressure responsive switch 65. Meter 64 indicates the system pressure. Switch 65 is comprised of a piston 66 which is responsive to the pressure in line 38. As viewed in FIGURE 2, pressure in the system moves piston 66 upward. The piston moves downward as system pressure drops. Piston 66 is connected with double pole switch 67 comprised of switch arms 67a and 67b both of which are movable from their solid line position, illustrated in FIGURE 2, to their phantom line position by movement of pistons 66.

Signal lamps 68 and 69 are provided, lamp 68 being green to indicate that the system is operating properly and the other lamp 69 being red to indicate that there is a fault in the system.

Green lamp 68 is connected through leads 192, 193 with terminal 194 for switch arm 67a and with terminal 195 for switch arm 67b. Red lamp 69 is connected by leads 196, 197 to terminal 198 for switch arm 67a and 199 for switch arm 67b.

Switch arm 67a is connected through lead 201 to termnial 185 of timer 62. Switch arm 67b is connected through lead 202 to terminal 186 of timer 62. Both of lamps 68 and 69 have their other terminal constantly connected to the power supply through lead 204. With the system in the position shown in FIGURE 2, the solenoid operated valve 56 is closed, as in box 56b, lubricant is passing through line 38 and into line 63, and piston 66 has been moved by the system pressure to move switch arms 67a and 67b upward as viewed in FIGURE 2. The green light 68 will be connected with the electric supply lines 40 through terminal 185, lead 201, switch arm 67a, terminal 194, leads 193, 192 and lead 204, if the system is operating properly. If, however, system pressure drops due to a leak in the system or due to a failure in pump 30, piston 66 and switch arms 67a, 67b move downward, and the circuit to red light 69 is completed through timer 62, lead 201, switch arm 67a, terminal 198, leads 197, 196 and lead 204 to indicate that the system is malfunctioning. If the pressure in the system increases excessively, the release valve 48 will open and pressure will be relieved through lines 50, 52. Therefore, the pressure in the system when the pump is operating will not exceed a predetermined safe level. Since system pressure is correct, the signal light will not be affected by opening of valve 48.

Malfunctions in the accumulator means 22 or meter units 20, if they do not decrease system pressure, will not affect the signal lights 68, 69. However, separate safety devices, not forming part of this invention, might be connected with the accumulator means and meter units to indicate or compensate for malfunctions.

When the timer 62 operates, so that arm 62a moves into contact with terminal 186, the circuit to motor 46 is open, and the circuit to solenoid switch 58 is closed, thereby causing valve 56 to assume the position shown in box 56a, whereby the system pressure in line 38 is immediately released through lines 60, 52 and the piston 66 moves downward, as viewed in FIGURE 2, thereby moving the switch arms 67a and 76b downward.

If the system is operating properly, the downward movement of switch arm 67b will complete a circuit to lamp 68 through timer 62, lead 202, switch arm 67b, terminal 195, leads 193, 192 and lead 202. If, however, the timer is operated so that switch arm 62a moved into contact with terminal 186 and solenoid switch 58 malfunctioned, then valve 56 will still be closed in its position shown in box 56b, instead of opening to its position shown in box 56a. System pressure will not be relieved and piston 66 will not move downward. Switch arm 67b will remain up and a circuit to red lamp 69 will be completed through timer 62, terminal 186, lead 202, switch arm 67b, terminal 199, leads 197, 196 and lead 202. In this manner, the red and green lights indicate whether the system is operating properly.

FIGURE 3 illustrates the single lubricant reservoir 28 and shows how the suction filter 34 and the one-way valve 36 are mounted within the reservoir 28. Also, FIGURE 3 shows the suction line 32 and the return line 42 which are connected to the control unit 70 represented schematically in FIGURE 2. Elements in FIGURE 3 which are identical to those schematically shown in FIGURE 2 are similarly numbered. In addition, there is a manually operable switch member 70a for actuating switch 44 between the off position where the contacts of both portions 44a and 44b of switch 44 are disengaged, the automatic operation position where the contacts of portion 44a are engaged so that lubricant passes through line 38 into the system, and the continuous pumping position, where the contacts of both portions 44a and 44b of switch 44 are engaged and lubricant being pumped returns to reservoir 28.

At fitting 71, line 38 which extends between unit 70 and main distribution line 14 is connected to control unit 70 so as to receive the lubricant under pressure from the pump 30.

The timer 62, which is conventional, includes, for example, a 7-day dial 71a and a 24-hour dial 71b. The 7-day dial 71a can be set in a known way to provide automatic operation during every working day of a given week, this dial being adjusted so as to exclude operation only during those days of the week when the plant is shut down, for example. The 24-hour dial 71b can be set in a known way to provide for predetermined periods of operation during each working day. For example, the dial 71b may be set to provide one period of operation of the pump, lasting for 15 minutes during each working shift. If there are two shifts in a particular plant, during each shift the pump means 30 will be automatically operated for 15 minutes, while during the third shift when the plant is shut down, the pump means will not operate.

Referring now to FIGURES 4 and 5, the details of the accumulator means 22 are illustrated therein. Each accumulator means 22 is a relatively small unit, having an overall height which may, for example, range from 4 to 6 inches and having an outer diameter which may be on the order of 2 inches or less. The accumulator means 22 may be designed, for example, to deliver a charge of from 1 to 8 cc. of lubricant during each stroke of the accumulator, or another size of accumulator may be used to deliver a charge from 8 to 16 cc. The accumulator is adjustable by adjusting means described below so as to control the amount of lubricant delivered at each stroke within the range for which the accumulator is designed.

The accumulator means 22 includes a body means 72 made up of a lower body member 74 and an upper body member 76 threaded one into the other with a suitable sealing gasket 78 situated therebetween. A cylinder 88 is threaded into the body 76 with a suitable sealing ring 90 engaging the inner end of the cylinder 88.

The body means 72 is provided with an inlet 80 through which the lubricant under pressure is pumped into the accumulator means. A filter 82 is clamped between suitable rings which are situated between the bodies 74 and 76. The body 76 is formed with a bore 84 in which a one-way valve 86 is accommodated, the valve 86 permitting a flow of lubricant into the cylinder 88 while preventing a flow of lubricant in the reverse direction. Since lubricant is precluded from escaping through inlet 80, when the accumulator means expels lubricant in the manner to be described, the lubricant can pass only to the outlet, whereby the object of providing an accumulator means is realized. The valve 86 remains closed until lubricant passing through the inlet into the space beneath the valve is at a predetermined pressure, for instance 30 p.s.i.

A piston 92 is slidable within the cylinder 88 and carries a sealing ring 94 which slidably engages the inner surface of the cylinder 88. A biasing means 96, in the form of a suitable coil spring, is situated within the cylinder 88 acting on the piston 92 to urge it downwardly, as viewed in FIGURE 5, in a direction displacing lubricant out of the cylinder 88. When the lubricant under pressure flows into the cylinder through inlet 80 and valve 86, the pressure of the lubricant compresses spring 96 and displaces the piston 92 upward.

The body means 76 is formed with an outlet 98 for the accumulator means 22 which communicates with a bore 100. Bore 100 communicates at its upper end with cylinder 88 and at its lower end with inlet 80. The bore 100 has a supportive stop ring 102 fixed therein at the end thereof adjacent inlet 80. Situated within the bore 100 and blocking the end thereof is a stationary tubular member 104 which is fixed in any suitable way in the bore 100, as by having a press fit therein. Tubular member 104 has an upper open end communicating with the cylinder 88 and a lower open end 105 directed toward the inlet 80. The upper and lower open ends are connected by a passage.

Open end 105 of tubular member 104 has a smaller diameter than the lower surface of hereinafter described piston 108 for reasons to be described.

In the region of the outlet 98, which extends radially with respect to and communicates with the bore 100, the tubular member 104 has an exterior portion 106 of reduced diameter, smaller than the diameter of bore 100, extending down to the lower open end 105 of the tubular member 104.

Situated within bore 100 is a second piston 108 which has a slidable fluid-tight engagement with the surface of the bore 100 and which at its top end has a compressible sealing plate 110 adapted to engage the lower open end 105 of the tubular member 104 so as to close the latter.

The tubular member 104 together with the second piston 108 form a pressure-responsive valve means for closing the outlet 98 during introduction of lubricant under pressure into the cylinder 88 and for opening the outlet 98 when the pump stops operating and the pressure at the inlet 80 drops.

During operation of the pump, the lubricant under pressure entering inlet 80 will act on the lower surface of piston 108 to move it into engagement with the lower open end 105 of tubular member 104 so as to close the end. As the pressure of the lubricant being pumped through the inlet exceeds the threshold pressure for opening valve 86, lubricant flows through valve 86 and bore 84 and flows into an annular groove 112 and engages the bottom end of piston 92 within the cylinder 88, displacing piston 92 in opposition to spring 96.

The lubricant in the space beneath piston 92 is under pressure due to spring 96. This lubricant pressure is transmitted through the passage in tubular member 104 and presses against sealing plate 110 of piston 108. However, the lubricant pressure in the space beneath piston 108 is the same as the pressure beneath the piston 92, since it is the pressure beneath piston 108 that causes piston 92 to rise. As was noted above, the area of the surface of piston 108 which faces inlet 80 is greater than the area of plate 110 exposed to the lower open end 105 of tubular member 104. Thus, the force beneath piston 108 forcing it upward against tubular member 105 is greater than the force on the sealing plate 110 pressing downward on piston 108, whereby the sealing plate 110 on piston 108 remains securely in engagement with the lower open end 105 of tubular member 104.

Piston 92 continues to rise until its upper surface 111 engages the fixed seating surface 113 at the end of later described sleeve 116. Spring 96 is compressed into annular groove 115 in piston 92 so that the surfaces 111 and 113 can come into engagement without interference from the body of spring 96.

The timer 46 is set to provide a period of operation for the pump means 30 which is sufficient to guarantee that the cylinder 88 of every one of the accumulators on every one of the branch distribution lines receives its full complement of lubricant before the pump stops.

When the pump 30 stops operating, switch 44 causes solenoid switch 58 to open valve 56 and the lubricant pressure in the system is released through valve 56 and return conduits 60, 52. The pressure of the lubricant in each inlet 80 of each accumulator and in the space beneath each piston 108 and each valve 86 reduces as the lubricant under pressure drains back into the reservoir. As soon as the lubricant pressure drops, one-way valve 86 closes and prevents back flow of lubricant which is beneath piston 92.

When the pressure in the space beneath piston 108 reduces sufficiently, the pressure in the cylinder 88 beneath piston 92, caused by spring 96 pressing on the piston, is sufficient to begin driving piston 108 downward. Immediately after piston 108 has begun moving downward, the lubricant beneath piston 92 is forced through the opening in tubular member 104 and fills the chamber beneath the lower open end 105 thereof. The lubricant under pressure now contacts the entire surface of sealing plate 110, instead of a small part thereof and shoots the piston 108 downward into engagement with supportive ring 102. Tubular member 104 is now in communication with outlet 98.

As each of the pistons 108 is shot downward, the small charge of lubricant beneath it is sent out the inlet of each accumulator into the system. This creates a small backward surge of lubricant through the system which passes through now open valve 56, and return lines 60, 52 into reservoir 28.

Spring means 96 expands, displacing piston 92 downwardly and displacing the lubricant out of cylinder 83, through tubular member 104, around the portion 106 of reduced diameter of tubular member 104 and through outlet 98 to the several meter units thereto connected.

With the accumulator of the invention, a single pump is used to fill all the accumulators located at different positions in the factory, plant or mill. The pump is timed to cease operation only after all of the accumulators have filled. This can be indicated when the pressure in the entire system surpasses a predetermined value, as indicated on pressure gauge 64. Each of the accumulators then discharges its own charge of lubricant, and each thereby individually acts as a pump at the particular machine or installation being lubricated. A single accumulator is sufficient for an entire machine, for part of a machine or for part of an installation of machines because the accumulator is used in combination with meter units which apportion the lubricant locally pumped by the accumulator to the various bearings and points to be lubricated.

As was indicated above, an adjusting means is provided for adjusting the capacity of the accumulator 22. The adjusting means includes the elongated threaded stud 114 which is freely slidable through the sleeve 116 that guides stud 114 for axial movement, together with piston 92. Sleeve 116 is carried by the cylinder 88 at its upper end wall. Threaded stud 114 is inserted into a threaded tapped bore in piston 92. At the exterior of the cylinder 88, stud 114 carries a pair of lock nuts 118. The guide sleeve 116 is fixed to the top wall of the cylinder 88 so that when it is engaged by the lower lock nut 118, the piston 92 cannot be displaced further in a downward direction by the spring 96. The structure is shown in FIGURE 5 adjusted for the maximum capacity of the accumulator. By turning the nuts 118 downwardly along the stud 114, the piston 92 will, at the end of its downward stroke, be situated at a higher elevation, thus reducing the amount of lubricant that is drawn into and delivered by the accumulator on each cycle. In this way, the adjusting means will control the amount of lubricant delivered by the accumulator with the range for which it is designed. The thread of the stud 114 may be designed in such a way that one complete turn of a nut 118 will change the volume by one cc., for example.

Each branch distribution line 16 communicates with the main distribution line 14 at a junction and each lubricating line 18 communicates with a branch distribution line at a junction. If the main distribution line, branch distribution lines and/or lubrication lines are embedded in either the floor, walls or ceiling of the plant, factory or mill, the junctions may be placed in a junction box 120 which is shown in FIGURES 6 and 7. This box includes a suitable container 122 embedded in a concrete floor 124, for example, and having a removable cover 126.

A junction between the main distribution line 14 and a branch distribution line 16 will be considered. Through a suitable T-fitting 121, branch distribution line 16 communicates with the main distribution line 14. Each of the lines 14, 16 is made up of an outer metal conduit 128 directly embedded in the concrete floor 124 and made of conventional tubular electrical conduit. The lubricant is carried by tubing 130, which may be flexible and comprised of nylon, which tubing is housed within the metal conduit 128. It is the tubing 130 which is connected directly with the fitting 121. In this way, the tubing 130 of the main and branch distribution lines is protected from the concrete by the hollow metal outer conduit 128. At the same time, the flexible tubing 130 can be inserted into and removed from the metal conduit 128, which remains embedded in the concrete, whenever it is desired to carry out any maintenance or repairs.

The T-fitting 121 has a cast metal T-joint element 123 which has interconnecting bores therethrough. Taking the bore 125, for example, the outlet portion 125a thereof has an enlarged diameter and is threaded for receiving the compression bushing 127, which has a threaded exterior in order that it might be screwed into the threaded portion 125a of bore 125. Near the end of tubing 130 that is inserted into bore 125 is mounted a flexible, compressible O-ring 129. The tubing is moved into bore 125 until the O-ring engages a receiving shoulder 129a which is at the base of the outlet portion 125a of bore 125. When the compression bushing 127 is screwed tight in the threaded portion of bore 125, the O-ring 129 is compressed and holds the exterior of the tubing 130 securely, and securely engages the interior of the widened portion of bore 125, thereby forming a liquid-tight seal and preventing tubing 130 from thereafter being axially moved in bore 125 without the bushing 127 being unscrewed. The T-fitting 121 is secured by a removable securing means, such as bolts 131, into the stationary base of the junction box.

If it is desired to remove or replace a particular length of tubing 130 with another length due, for example, to a break in one length of tubing, or if it is desired to insert a new length of tubing on a heretofore unused branch of fitting 121 to form a new lubricant transmitting line, the securing means 131 for the T-fitting 121 are released, and the T-fitting is moved to permit the branch distribution line to be replaced or inserted into the T-fitting.

Turning to FIGURE 6A which schematically shows a plurality of junction boxes, if it were desired to remove the branch line 16 in FIGURE 6, movement of the T-fitting 129 coaxially with the line 16 will bend the main distribution line 14 in a manner in which it was not intended to be bent, thereby creating a danger that the line 14 might be broken. It may be accordingly necessary to loose the distribution line securing fittings in other junction boxes and to move these fittings so that the T-fittings 121 may be moved without endangering other distribution lines therewith connected.

Referring to FIGURE 6, if it is desired to remove conduit 16 from T-joint 121, th esecurement of conduit 16 in T-fitting 121 is loosened. T-joint 121a in junction box 120a must be released and moved downward, as viewed in FIGURE 6A, coaxially with the axis of conduit 16, to enable conduit 16 to be shifted axially to facilitate its removal. However, if T-fitting 121a is shifted coaxially with conduit 16, there is a danger of shearing off lubrication line 18. Accordingly, junction box 120b must be opened and elbow 121b must be moved to the right, as viewed in FIGURE 6A. To remove elbow 121b to the right, as viewed in FIGURE 6A, the conduit joining elbow 121b and accumulator 22 must be removed from elbow 121b. Therefore, in order the conduit joining accumulator 22 with elbow 121b is removed from the elbows and conduit 18 is moved to the right, thereby removing it from its interfering position with respect to movement of T-fitting 121a. T-fitting 121a is then moved downward, as viewed in FIGURE 6A. The conduit 16a moves further into the T-fitting 121a when that T-fitting is moved downward. The O-ring or other liquid-tight securing means around conduit 16a, the equivalent of ring or liquid-tight means 129, is loosened so that it will not interfere with the movement of conduit 16a into T-fitting 121a. After T-fitting 121a has been moved downward, as viewed in FIGURE 6A, conduit 16 will be free of T-fitting 121a and may be moved free of T-fitting 121. Thereafter, conduit 16 may be removed and replaced. The various conduits and T-fittings are then repositioned in their original positions and resecured. Thus, by using a junction box arrangement such as that just described, conduits may be removed and replaced without their having to be sawed.

The particular junction box installation which is shown in FIGURES 6 and 7 is that which is used to connect the line 38 to the line 14. For this purpose, the cover 126 has an opening through which the line 38 extends. A suitable shut-off valve 132 is connected to the line 38 just over the junction box, in the manner shown in FIGURE 7.

A typical machine lubricating line is illustrated in FIGURE 8. The accumulator 22 is connected at its outlet to the machine lubricating line 18 which carries a junction 134 connected with meter units 20 through which lubricant flows along the lines 136 to parts of the machine such as drive gears thereof. The line 18 further includes additional junctions 134 of different types connected with several meter units 20 through which the lubricant is delivered to parts such as tailpipes 136a for providing lubricant to the various parts of the machine.

Each meter unit 20 may have, as shown in FIGURE 9, an axially bored body 140 provided in its interior with a precisely reamed bore 142 in which, for example, a float pin 144 is located to control the metering of the oil through the metering unit 20, the lubricant flowing in the direction of the arrow 146 shown in FIGURE 9. The lubricant enters through a filter 148 to flow along the bore 142 around the float pin 144 which is loose within bore 142. Non-return valve 150 is urged onto its seat by spring 152. At its end distant from valve 150, spring 152 engages a perforated plate 154 which is fixed in the outlet end 156 of the meter unit 20. The operative width of bore 142 determines the volume of lubricant that can flow through the meter unit over a period of time. In this way, each meter unit 20 apportions the flow of lubricant to a given part of the machine.

Thus, it will be seen that with the system of the invention, only one source of lubricant is required for all of the machines in a single plant, mill or factory, this source being in the form of a single reservoir, such as the drum 28. It is an easy matter for the operator to periodically check whether there is sufficient oil in the drum 28. From this single reservoir, the single pump 30 for the entire system delivers the oil to the plurality of accumulators, each of which then delivers lubricant to its respective machine, in the manner described above, as soon as the pump stops operating. Because the system employs a plurality of accumulators to serve as secondary lubricant pumping means to a predetermined group of meter units, the system pressure may be maintained at a lower level, the pressure drop over the system will be less, the pump for the entire system need not be very powerful, the lubricant carrying conduits need not be extra thick to contain high pressure, and the system may be much more compact.

At the same time, the entire installation, except for the central pumping station 12, can be embedded within a floor such as the concrete floor 124, so that there are no exposed lubricanting lines extending between the machines, the only exposed lines being at the central pumping station and at the machines themselves where the machine lubricating lines 18 are located. The valves 24 and 26, of course, are maintained accessible above the floor so that any selected line may be shut off while the system continues to operate with the remaining lines.

Although this invention has been described with respect to its preferred embodiments, it should be understood that many variations and modifications will now be obvious to those skilled in the art, and it is preferred, therefore, that the scope of the invention be limited not by the specific disclosure herein.

The embodiments of the invention in which an exclusive privilege or property is claimed are defined as follows:

1. A system for distributing lubricant to a plurality of machine parts, comprising,
   a lubricant reservoir,
   a cyclic pump means communicating with said reservoir for pumping lubricant therefrom when said pump is operating and for halting the pumping therefrom when said pump ceases operating;
   a main distribution line communicating with said pump means to receive lubricant under pressure threfrom;
   a plurality of branch distribution lines communicating with said main distribution line to receive lubricant from the latter; a plurality of machine lubricating lines communicating with each branch distribution line to receive lubricant from the latter and each to deliver the lubricant to a plurality of metering units;

a plurality of metering units communicating with each machine lubricating line for apportioning the flow of lubricant therefrom to predetermined machine parts;

means for venting the distribution lines to reduce system pressure when said pumping means has halted operation;

accumulator means interposed within each machine lubricating line upstream of said meter units which communicate therewith;

each said accumulator means comprising an inlet which is connected with a chamber for receiving lubricant when said pumping means is pumping lubricant, an outlet from said chamber to said machine lubricating line, and blocking means for blocking lubricant exit from said chamber outlet until after said pump means has ceased operating and for unblocking said chamber outlet responsive to the reduction in system pressure resulting from the venting of the system when said pump means halts operation, and means in said chamber for forcing lubricant out said outlet after said pump means has ceased operating and said outlet is unblocked;

a timing means connected with said pump means for causing same to operate for a predetermined period sufficient for pumping lubricant to fill all of said accumulator means chamber with lubricant and for then causing said pump means to cease operating so that lubricant is not pumped to said accumulator means until the next cycle.

2. The system of claim 1, wherein an adjusting means is operatively connected with each accumulator means for adjusting the capacity thereof.

3. The system of claim 1, wherein each of said plurality of branch distribution lines is connected in parallel with other branch distribution lines.

4. The system of claim 3, wherein each of said plurality of machine lubricating lines which communicate with each said branch distribution line is connected in parallel with other machine lubricating lines communicating with its respective branch distribution lines.

5. The system of claim 4, wherein a shut-off valve is operatively connected with each machine lubricating line upstream of the respective accumulator means which communicates therewith;

and a shut-off valve is operatively connected with each branch distribution line upstream of all of the machine lubricating lines communicating therewith.

6. The system of claim 1, wherein each of said plurality of machine lubricating lines which communicate with each said branch distribution line is connected in parallel with other machine lubricating lines communicating with its respective branch distribution lines.

7. The system of claim 2, wherein each accumulator means includes an inlet through which lubricant under pressure is received from said pump means, an outlet through which lubricant is discharged from said accumulator means;

a cylinder, a piston slidable in said cylinder, a spring acting on said piston for urging the latter in a direction displacing lubricant out of said cylinder;

a one-way valve interposed between said inlet and said cylinder for directing lubricant under pressure from said inlet through said one-way valve into said cylinder to displace said piston therein in opposition to said spring acting thereon;

and a pressure-responsive valve interposed between said cylinder and said outlet and also communicating with said inlet for responding to the lubricant under pressure received through said inlet, whereby said pressure responsive valve is movable to close said outlet to prevent discharge of lubricant while lubricant flows through said one-way valve into said cylinder; said pressure-responsive valve responding to the drop in pressure when the pump means stops operating, whereby said pressure-responsive valve is movable to open said outlet for providing communication between said outlet and said cylinder to provide for lubricant flow from said cylinder through said outlet while said spring displaces said piston in said cylinder in said direction which displaces lubricant out of said cylinder.

8. The system of claim 7, wherein said accumulator means further includes, a body carrying said cylinder, said body being formed with a bore which extends parallel to the cylinder axis and which has an open end communicating with the cylinder to receive lubricant therefrom when said piston is displaced by said spring in said direction;

said outlet communicating radially with said bore of said body;

and said pressure-responsive valve including a tubular member fixed in said bore and having a passage therethrough; said passage having one open end for receiving lubricant from said cylinder and an opposed end distant from said cylinder;

a second piston slidable in said bore between said tubular member and said inlet for responding to the pressure of the lubricant entering through said inlet, said second piston having a first surface directed toward said opposed open end of said tubular member and a second surface directed toward said inlet; said first surface being pressed against said tubular member at said opposed open end thereof when lubricant under pressure enters said cylinder through said inlet and one-way valve, thereby to prevent lubricant from discharging through said tubular member as long as the lubricant flows under pressure into said cylinder, said second piston automatically responding to the pressure of the lubricant in said cylinder when the pressure at said inlet drops upon termination of the operation of said pump means to be displaced away from said opposed open end of said tubular member, thus opening the latter to provide for automatic discharge of lubricant from said accumulator means;

said first and said second surfaces of said second piston being of greater area than the passage through said tubular member at said opposed end thereof.

9. The system of claim 8, wherein junction box installations are provided, respectively, at the connnections between the main and branch distribution lines and have covers which can be removed to give access to said connections.

10. The system of claim 9, wherein each of said main and branch distribution lines includes an outer metal conduit and inner tubing extending through said outer metal conduit to be protected thereby from the floor material as well as to be removable through said outer conduit when any line requires replacement or repairs.

11. An accumulator adapted to be used in a lubricant distribution system, comprising, body means formed with an inlet through which lubricant enters into the accumulator and an outlet through which lubricant discharges from the accumulator;

a cylinder carried by said body, a piston slidable in said cylinder, spring means acting on said piston for urging the latter in a direction which will displace lubricant out of said cylinder;

one-way valve means carried by said body in the path of flow of lubricant from said inlet to said cylinder to provide for lubricant flow from said inlet to said cylinder while preventing lubricant flow in the reverse direction;

pressure-responsive valve means carried by said body and communicating with said inlet, said outlet and said cylinder for responding to the pressure of lubricant entering through said inlet, whereby said pressure-responsive valve means is movable to close said outlet while lubricant flows into said cylinder in opposition to said spring means, displacing said piston in said cylinder in a direction opposed to said direction which displaces lubricant out of said cylinder; said pressure-responsive valve means responding to a drop in pressure at said inlet when the supply of lubricant therethrough terminates, whereby said pressure-responsive valve means is movable to open said outlet for automatically placing said outlet in communication with said cylinder to receive lubricant therefrom while said spring means displaces said piston in said direction which displaces lubricant out of said cylinder;

said body means being formed with an elongated bore communicating at one end with said cylinder to receive lubricant therefrom when the lubricant is displaced out of said cylinder by said piston and said bore communicating at an opposite end thereof with said inlet, said outlet communicating radially with said bore;

said pressure-responsive valve means including a tubular member fixed in said bore and formed with a passage which extends longitudinally of said bore; said passage having one end communicating with said cylinder and having an opposite end directed toward said inlet;

said pressure-responsive valve means including a second piston slidable in said bore between said tubular member and said inlet, said second piston having a first surface which is pressed against the end of said tubular member that is directed toward said inlet by lubricant under pressure entering through said inlet for closing said tubular member and thus preventing the flow of lubricant from said cylinder to said outlet while lubricant enters into said cylinder displacing said piston therein in opposition to said spring means, said second piston having a second surface which is directed toward said inlet;

said first and said second surfaces of said second piston being of greater area than the passage through said tubular member at said opposed end thereof.

12. The accumulator of claim 11 further including, an adjusting means connected with said piston for limiting the maximum length of the stroke thereof, thereby determining the volume of lubricant expelled by said accumulator means.

References Cited

UNITED STATES PATENTS

| | | | |
|---|---|---|---|
| 2,996,147 | 8/1961 | Callahan | 184—7 |
| 3,031,032 | 4/1962 | Dinkelkamp et al. | 184—7 |
| 3,127,954 | 4/1964 | Callahan et al. | 184—7 |
| 3,145,803 | 8/1964 | Cobert | 184—7 |
| 3,317,002 | 5/1967 | McKenzie | 184—7 |
| 3,353,712 | 11/1967 | Prescott | 222—335 XR |
| 3,393,841 | 7/1968 | Brehmer | 222—335 |

FRED C. MATTERN, Jr., Primary Examiner

MANUEL A. ANTONAKAS, Assistant Examiner

U.S. Cl. X.R.

137—561.1; 222—335